(12) United States Patent
Fan et al.

(10) Patent No.: US 8,700,678 B1
(45) Date of Patent: Apr. 15, 2014

(54) DATA PROVENANCE IN COMPUTING INFRASTRUCTURE

(75) Inventors: Chenhui Fan, Shanghai (CN); Lun Zhou, Shanghai (CN); Stephen Todd, Shrewsbury, MA (US); Qiyan Chen, Shanghai (CN); Tianqing Wang, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/333,307

(22) Filed: Dec. 21, 2011

(51) Int. Cl.
*G06F 17/30* (2006.01)
(52) U.S. Cl.
CPC .............. *G06F 17/30286* (2013.01)
USPC .............. 707/803; 707/602; 707/802
(58) Field of Classification Search
CPC ................................ G06F 17/30286
USPC ...................... 707/803, 802, 999.1
See application file for complete search history.

(56) References Cited

U.S. PATENT DOCUMENTS

| | | | | |
|---|---|---|---|---|
| 2007/0288247 A1* | 12/2007 | Mackay | ............................. | 705/1 |
| 2008/0307104 A1* | 12/2008 | Amini et al. | ................... | 709/231 |
| 2010/0070463 A1* | 3/2010 | Zhao et al. | .................... | 707/608 |
| 2010/0114629 A1* | 5/2010 | Adler et al. | ........................ | 705/7 |
| 2010/0114630 A1* | 5/2010 | Adler et al. | ........................ | 705/7 |
| 2011/0238379 A1* | 9/2011 | Misra et al. | .................... | 702/187 |
| 2011/0267351 A1* | 11/2011 | Curbera et al. | ............... | 345/440 |

OTHER PUBLICATIONS

P. Mell et al., "The NIST Definition of Cloud Computing," National Institute of Standards and Technology (NIST), Special Publication 800-145, Sep. 2011, 7 pages.
U.S. Appl. No. 13/077,213 filed in the name of J.J. Moore et al. on Mar. 31, 2011 and entitled "Capture/Revert Module for Complex Assets of Distributed Information Technology Infrastructure."

* cited by examiner

*Primary Examiner* — Miranda Le
(74) *Attorney, Agent, or Firm* — Ryan, Mason & Lewis, LLP

(57) ABSTRACT

Techniques are disclosed for generating data provenance associated with a computing system. For example, a method comprises the following steps. Information associated with the execution of a given process in a given computing environment in accordance with a given process data set is captured. A provenance data set is generated based on the captured information. The generated provenance data set comprises one or more states associated with one or more execution components of the given computing environment that existed during the execution of the given process. At least a portion of the generated provenance data set may be utilized to revert the computing environment back to the one or more states associated with the one or more execution components of the given computing environment that existed during the execution of the given process.

16 Claims, 6 Drawing Sheets

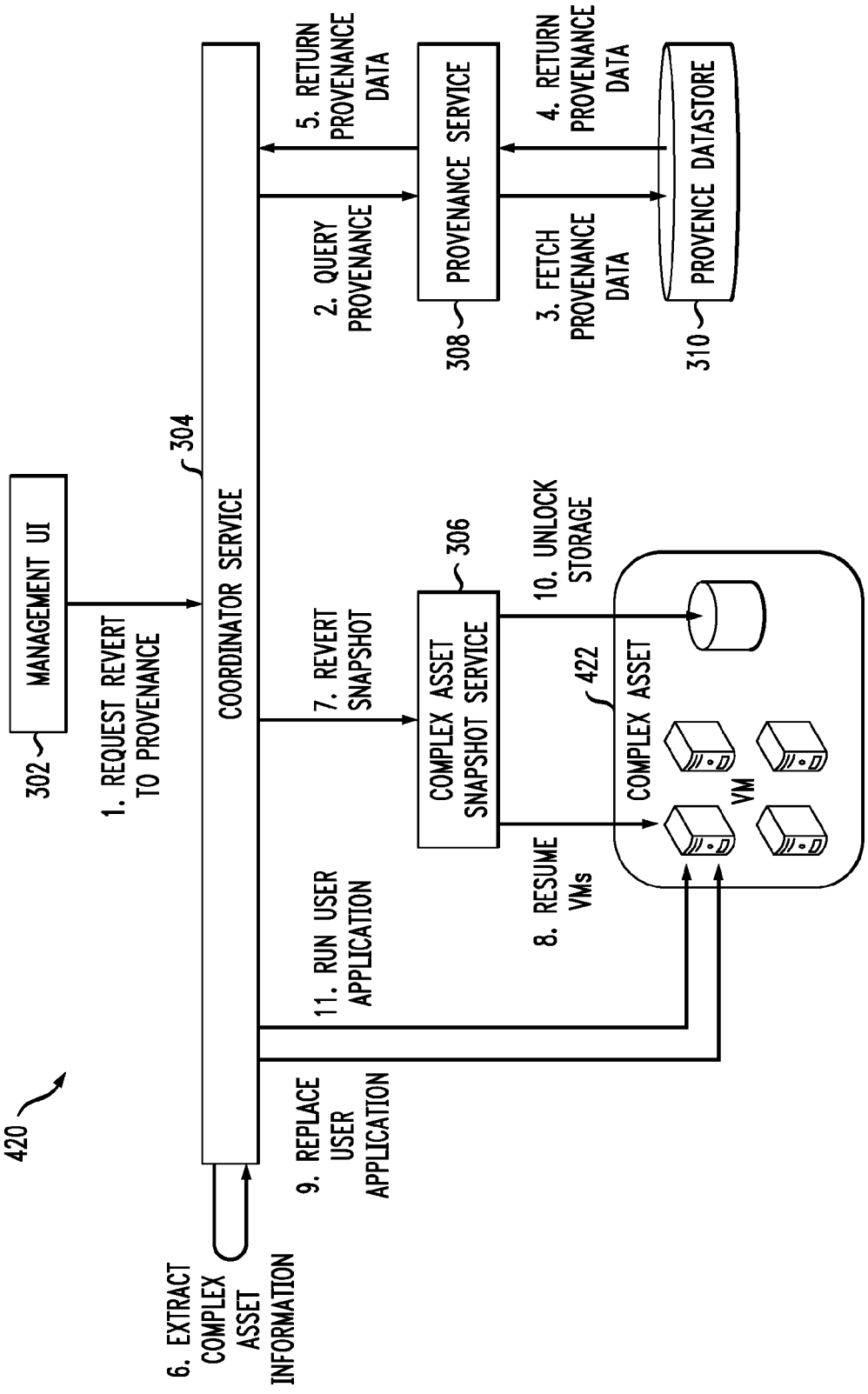

DATA PROVENANCE IN COMPUTING INFRASTRUCTURE

FIELD

The field relates to computing systems, and more particularly to techniques for generating data provenance associated with such computing systems.

BACKGROUND

As is known, provenance refers to the history or lineage of a particular item or object. Thus, in a computing system, provenance may be generated that indicates from what sources a particular data item or object was derived. For example, provenance may be obtained that specifies which particular application program generated which particular data item, as well as what other data items were used to derive the particular data item.

It is also known that user application programs can be complex, and can execute over a relatively long time period, e.g., several weeks or months. In such a scenario, it is understood that provenance may be obtained specifying the lineage associated with particular data sets and particular application programs.

However, assume that some time early or midway through the overall execution time period, an error occurred in the user application. Provenance could provide some insight as to the user application and data sets that were involved at the time of the error. Now suppose the error was caused, not by the user application or data set, but rather by a computing resource in the computing environment that executed the user application. Existing provenance generation techniques would be unable to provide an indication as to what computing resource caused the problem. Further, even if one could somehow pinpoint a computing resource, one would still be unable to readily troubleshoot what went wrong with the particular computing resource.

SUMMARY

Embodiments of the present invention provide techniques for generating data provenance associated with a computing system.

In one embodiment, a method comprises the following steps. Information associated with the execution of a given process in a given computing environment in accordance with a given process data set is captured. A provenance data set is generated based on the captured information. The generated provenance data set comprises one or more states associated with one or more execution components of the given computing environment that existed during the execution of the given process. At least a portion of the generated provenance data set may be utilized to revert the computing environment back to the one or more states associated with the one or more execution components of the given computing environment that existed during the execution of the given process.

In another embodiment, a computer program product is provided which comprises a processor-readable storage medium having encoded therein executable code of one or more software programs. The one or more software programs when executed by a processor of a processing device implement steps of the above-described method.

In yet another embodiment, an apparatus comprises a memory and a processor operatively coupled to the memory and configured to perform steps of the above-described method.

Advantageously, by being able to revert to the execution environment of a given computing system that existed at a given time, a process (e.g., a user application) can be re-executed with the same process data set that was originally used, or with a new replacement process data set. Also, the process itself can be replaced such that a replacement process can be executed in the same execution environment that was used to execute the original process.

These and other features and advantages of the present invention will become more readily apparent from the accompanying drawings and the following detailed description.

BRIEF DESCRIPTION OF THE DRAWINGS

FIG. 4C shows a revert with new user application methodology performed in the system of FIG. 3 in accordance with one embodiment of the invention.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

As used herein, the term "provenance" refers to an indication or determination of where a given object, item or thing came from, or an indication or determination of one or more objects, items or things from which the given object, item or thing was derived. That is, the term "provenance" refers to the history or lineage of a given object, item or thing (or multiple objects, items and things). Thus, "provenance information" or "provenance data" (also referred to herein as "provenance metadata") is information or data that provides this indication or results of such determination.

Furthermore, as used herein, the phrase "data object" or simply "object" refers to any given data item or data unit that may be part of an information network. An object or data object may take on any form and it is to be understood that the invention is not limited to any particular form. For example, an object may be electronic data such as one or more web pages, documents, records, files, images, videos, or any other type of data set, data item, or data unit. Thus, embodiments of the invention are not limited to any particular type of data object.

Figure 1A:
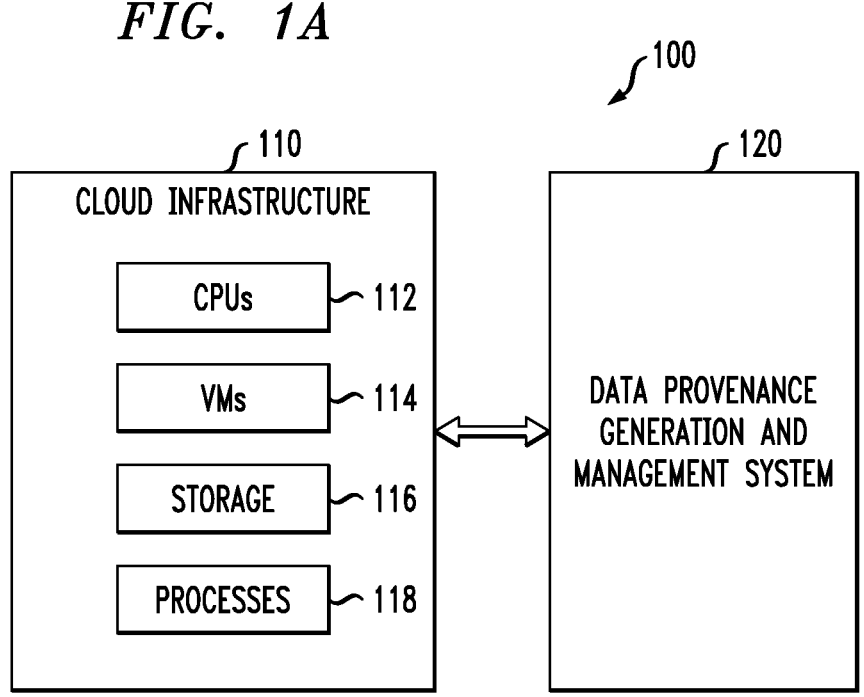
FIG. 1A shows cloud infrastructure and a data provenance generation and management system in accordance with one embodiment of the invention.

FIG. 1A shows a system 100 configured in accordance with an illustrative embodiment of the present invention. The system 100 comprises cloud infrastructure 110 and a data provenance generation and management system 120. As will be explained in detail below, data provenance generation and management system 120 captures information associated with the execution of one or more processes (e.g., application programs or user applications or apps) in cloud infrastructure 110. Cloud infrastructure 110 is illustratively depicted in the figure as comprising an execution environment with execution components comprising one or more central processing units (CPUs) 112, one or more virtual machines (VMs) 114, and storage (storage units) 116 that execute one or more processes 118 that operate on one or more process input data sets that generate one or more process output data sets.

The data provenance generation and management system 120 then generates a provenance data set based on the captured information. In addition to including information on a process(es) and associated data set(s), the generated provenance data set includes one or more states associated with one or more of the execution components of the execution environment that existed during the execution of the process. For example, the provenance data set can include an indication of the specific execution states of specific VMs (e.g., specific data values that were loaded into specific VM execution units) that were used to execute the process at any previous time instance. It is to be understood that this is only one example of what is meant by states associated with one or more of the execution components of the execution environment that existed during the execution of the process, and that states associated with CPUs, storage units, and other execution components may be part of the provenance data set.

Accordingly, the data provenance data set generated in accordance with one or more embodiments of the invention are enhanced, as compared to existing provenance data sets, by adding metadata about the given execution environment. This allows for the ability to trace the execution environment, as well as the ability to revert to any execution stages from which data is derived. As will be explained below, a set of revert functionalities can be used for many advanced use cases.

An illustrative provenance data set may thus include three metadata dimensions: data set, user application (process), and execution environment. The data set may describe current data and ancestor data, and on which storage unit in the cloud infrastructure specific data is stored. The user application is the process (or processes) that is running in the execution environment to produce data. The "execution environment" (or computing environment) is the environment that includes computing resources and their states that are used to execute a user application. In one example, the execution environment may be captured as a "complex asset snapshot." A complex asset snapshot is an abstraction of the execution environment for the user application in the virtual cloud environment, which is typically an encapsulation that includes any number of virtual machines as well as one or more associated external cloud storage volumes. The complex asset can be snapshotted (captured) and reverted at any time. The complex asset snapshot is an example of a paradigm employed to ensure capture of a consistent state across all components in the given execution environment.

One example of a technique that can be utilized to capture a consistent state across components in an execution environment is described in the copending U.S. patent application identified as Ser. No. 13/077,213, filed on Mar. 31, 2011, which is commonly assigned herewith and incorporated by reference herein. However, use of such technique is not a requirement of the present invention. The methodology described therein introduces a mechanism to guarantee that all simple assets, within a given complex asset, have their state captured (persisted)/reverted at a particular point-in-time. The technique allows for simple assets to be coupled via any interconnect mechanism. For virtual machines persisting state, a hypervisor (as will be explained below in the context of FIG. 1B) is able to maintain the memory image of a virtual machine at time $t_n$, and persist that memory image to disk in an asynchronous manner while the virtual machine is live. For external storage volumes capturing state, a storage device is able to persist cache and create a volume delta associated with the time $t_n$. For virtual machines reverting state, a hypervisor is able to revert the virtual machine image immediately, load just enough pages into memory for the virtual machine to begin execution, and schedule the virtual machine while the rest of its memory is loaded. For storage volumes reverting state, the storage device is able to quickly load the minimal cache associated with the storage checkpoint, overlay the delta in an expedited manner, and unlock the volume while the rest of its cache is loaded. This process is typically very fast because of the maturity associated with external storage platforms. A persistence state machine is employed that is based at least in part on a virtual machine persistence state model and a storage persistence state model. Similarly, a reversion state machine is employed that is based at least in part on a virtual machine reversion state model and a storage reversion state model.

It is to be appreciated that alternative techniques for capturing state information of components in an execution environment may be employed.

Although the system elements 110 and 120 are shown as separate elements in FIG. 1A, these elements or portions thereof may be implemented at least in part on a common processing platform. In other embodiments, one or more of the system elements 110 and 120 may each be implemented on a separate processing platform, such as the processing platform to be described below in conjunction with FIG. 2. For example, the cloud infrastructure 110 may be implemented on a first processing device of a first processing platform and the data provenance generation and management system 120 may be implemented on a second processing device of a second processing platform. It is also to be understood that a given embodiment of the system 100 may include multiple instances of the elements 110 and 120, although only single instances of such elements are shown in the system diagram for clarity and simplicity of illustration.

Figure 1B:
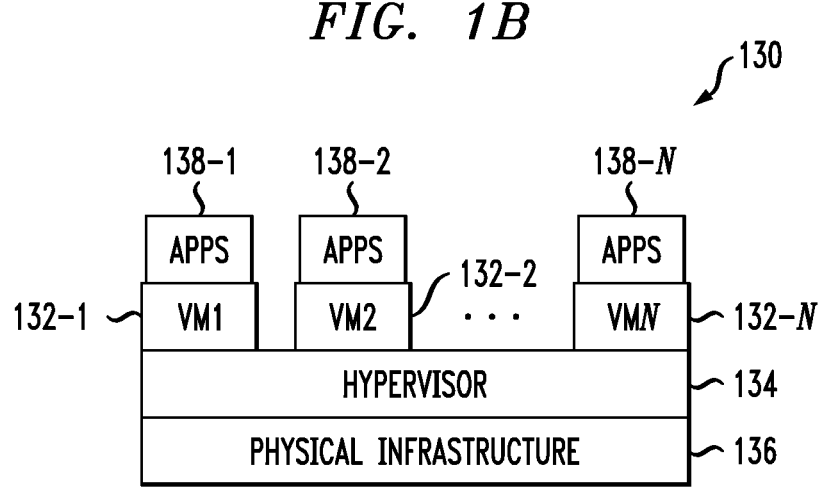
FIG. 1B shows a more detailed view of the cloud infrastructure of FIG. 1A.

As shown in FIG. 1B, the cloud infrastructure 130 (corresponding to 110 in FIG. 1A) comprises virtual machines (VMs) 132-1, 132-2, . . . 132-N implemented using a hypervisor 134. The hypervisor 134 is an example of what is more generally referred to herein as "virtualization infrastructure." The hypervisor 134 runs on physical infrastructure 136 (e.g., such as may include CPU(s) 112 and/or storage units 116 in FIG. 1A). The cloud infrastructure 130 further comprises sets of applications 138-1, 138-2, . . . 138-N running on respective ones of the virtual machines 132-1, 132-2, . . . 132-N under the control of the hypervisor 134.

Although only a single hypervisor 134 is shown in the example of FIG. 1B, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor 134 (or VM monitor software) which, as shown in FIG. 1B, is directly inserted on top of the computer hardware in order to allocate hardware resources of the physical computer dynamically and transparently. The hypervisor 134 affords the ability for multiple operating systems to run concurrently on a single physical computer and share hardware resources with each other.

An example of a commercially available hypervisor platform that may be used to implement portions of the cloud infrastructure 130 (110) in one or more embodiments of the invention is the VMware® vSphere™ which may have an associated virtual infrastructure management system such as the VMware® vCenter™. The underlying physical infrastructure 136 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 130 (110).

Figure 2:
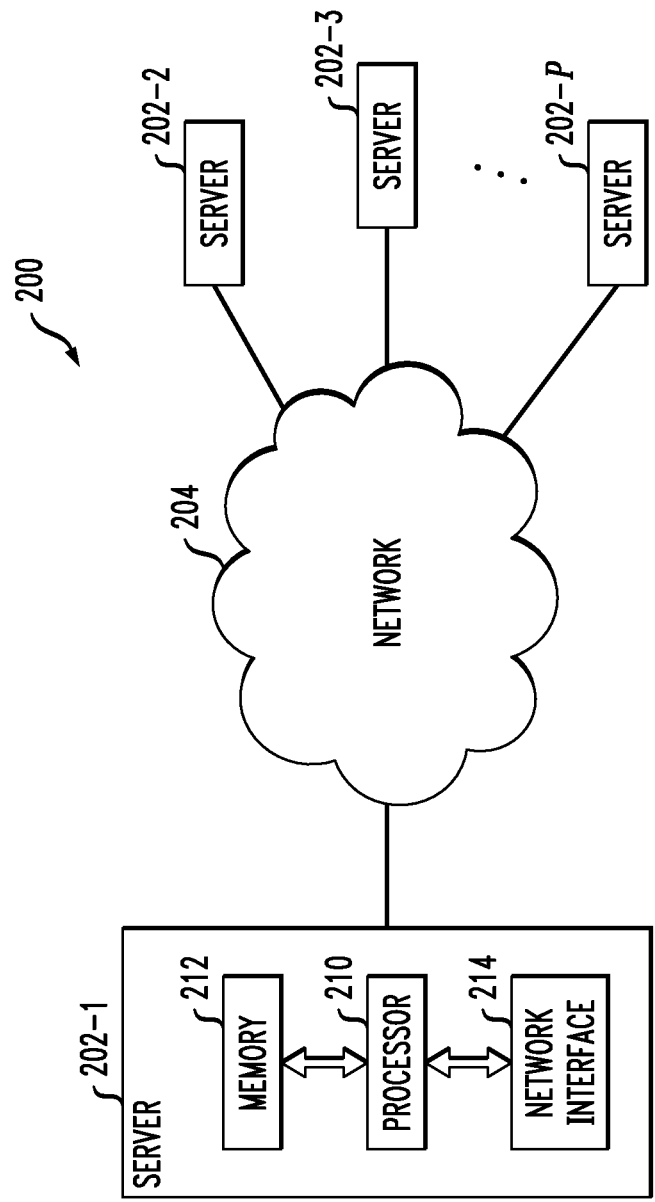
FIG. 2 shows a processing platform on which the cloud infrastructure and the data provenance generation and management system of FIG. 1A are implemented in accordance with one embodiment of the invention.

An example of a processing platform on which the cloud infrastructure 110 and/or the data provenance generation and management system 120 of FIG. 1A may be implemented is processing platform 200 shown in FIG. 2. The processing platform 200 in this embodiment comprises at least a portion of the system 100 and includes a plurality of servers, denoted 202-1, 202-2, 202-3, . . . 202-P, which communicate with one another over a network 204. One or more of the elements of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of system 100. Again, multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product." A computer program product comprises a processor-readable storage medium having encoded therein executable code of one or more software programs. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of system 100. One skilled in the art would be readily able to implement such software given the teachings provided herein. Other examples of computer program products embodying embodiments of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, etc. Again, the particular processing platform shown in the figure is presented by way of example only, and system 100 may include additional or alternative processing platforms, as well as numerous distinct processing platforms in any combination.

Also, numerous other arrangements of servers, computers, storage devices or other components are possible in system 100. Such components can communicate with other elements of the system 100 over any type of network, such as a wide area network (WAN), a local area network (LAN), a satellite network, a telephone or cable network, or various portions or combinations of these and other types of networks.

Illustrative details of the data provenance generation and management system 120, as well as operations of elements of system 120 will now be described with reference to FIGS. 3 through 4D.

Figure 3:
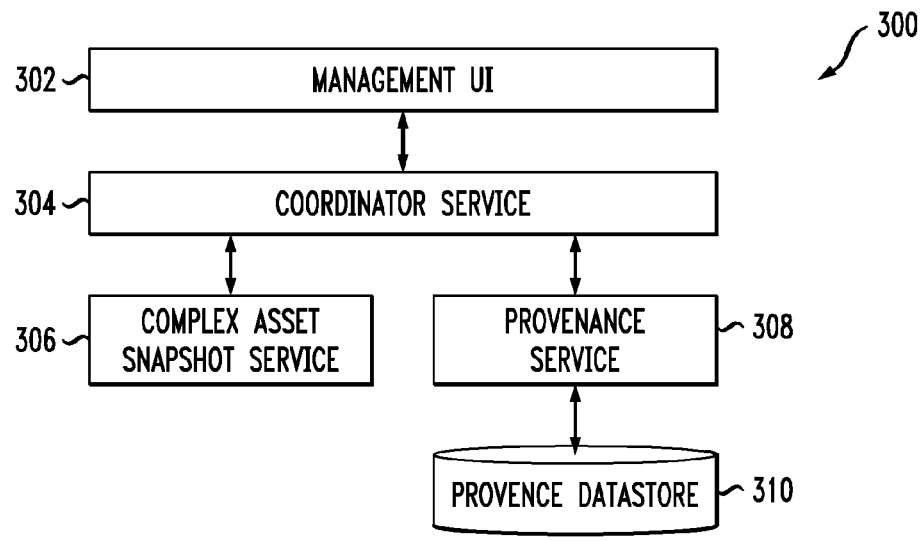
FIG. 3 shows a data provenance generation and management system in accordance with one embodiment of the invention.

FIG. 3 shows a data provenance generation and management system 300 in accordance with one embodiment of the invention. System 300 is one example of system 120 of FIG. 1A. As shown, system 300 includes a management user interface (UI) 302, a coordinator service module 304, a complex asset snapshot service module 306, a provenance service module 308, and a provenance datastore 310.

Recall that system 300 (120) generates provenance which includes metadata associated with the execution environment, and enables a reversion to a prior execution environment, when desired, to: (1) re-execute the original application with the original data set; (2) execute a new (replacement) application with the original data set; or (3) execute the original application with a new (replacement) data set.

The management UI 302 provides an interface to a user of system 300. In one embodiment, the interface may be a graphical user interface having display features that are selectable by the user, and that allow the user to enter data and view data. In another embodiment, the interface may be a computer interface or network interface that allows another system or network to access the provenance generation and management functions of system 300.

More particularly, UI 302 allows the user or another system to set up one or more policies that can be applied to the provenance generation and management functions of system 300. UI 302 also allows the user or other system to trigger provenance data generation to run at any time during the lifecycle of the subject application.

Further, when provenance data is in the form of a directed acyclic graph (DAG), UI 302 allows for browsing a complete provenance DAG that produced the current data set, as well as query individual provenance nodes. It is known that a DAG can generally be used to represent a set of programs where the input, output, or execution of one or more programs is dependent on one or more other programs. In such a case, the programs are nodes (vertices) in the graph, and the edges (arcs) identify the dependencies. Nodes and edges may have other allocations.

Still further, UI 302 allows the user or the other system to revert to any historical provenance node, as well as replace the application (e.g., without discarding the data set) or update or replace the data set (e.g., without interrupting the running of the application).

The coordinator service module 304, coupled to the UI 302, implements the one or more provenance policies and triggers provenance by coordinating the complex asset snapshot service module 306 and the provenance service module 308.

The complex asset snapshot service module 306 creates the snapshot for a complex asset or reverts to any existing snapshot. The provenance service module 308 accepts requests from the coordinator service module 304 to create/query provenance nodes. The provenance service module 308 utilizes immutable datastore 310 (e.g., a cloud database or Centera™ which is available from EMC Corporation of Hopkinton, Mass.) to store provenance metadata.

In one example, a provenance node is created when: (1) the user submits a request via UI 302; (2) a scheduled event is triggered according to a provenance policy (scheduled by the user via UI 302); (3) a complex asset snapshot is requested; and (4) a milestone event is triggered by the application.

Figure 4A:
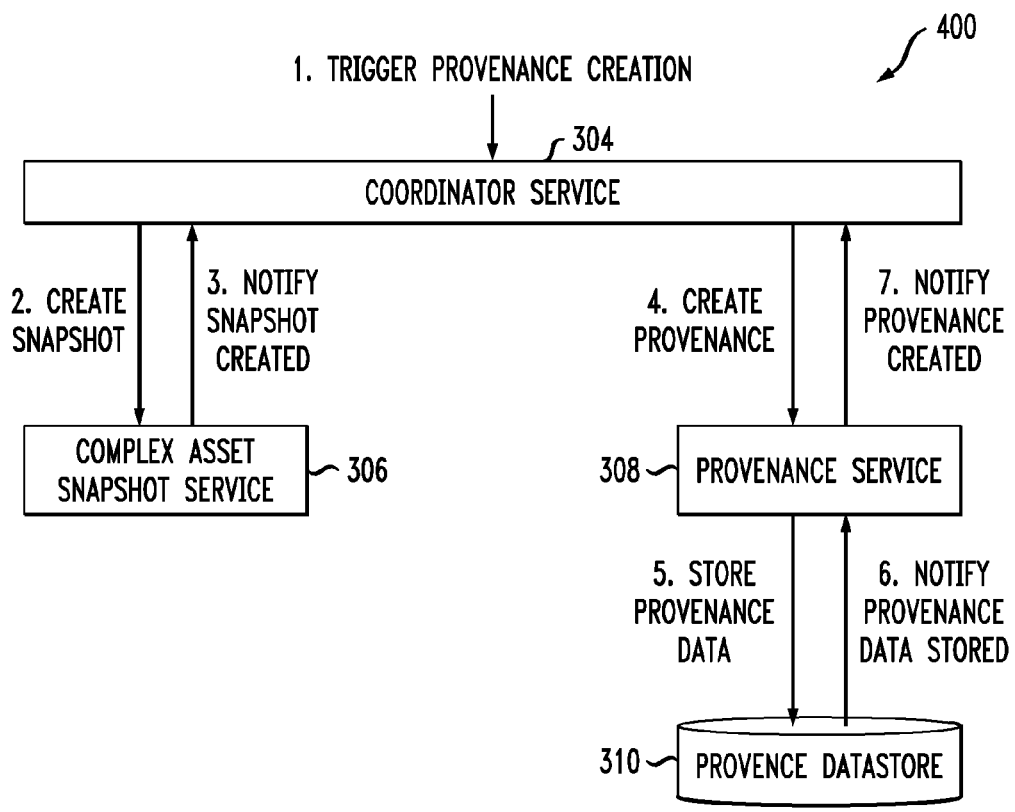
FIG. 4A shows a provenance generation methodology performed in the system of FIG. 3 in accordance with one embodiment of the invention.

FIG. 4A shows a provenance generation methodology 400 performed in the system of FIG. 3 in accordance with one embodiment of the invention. As shown, the coordinator service module 304 accepts a request from UI 302 (not shown) to trigger provenance creation (step 1). Module 304 sends a snapshot request to the complex asset snapshot service module 306 (step 2).

Complex asset snapshot service module 306 triggers a snapshot (captures complex asset snapshot information) and sends a notification (with the captured information) to coordinator service module 304 (step 3). Module 304 sends a provenance creation request (with the captured information) to the provenance service module 308 (step 4).

The provenance service module 308 composes metadata from the captured information and saves the metadata to the provenance datastore 310 (step 5). Datastore 310 sends a notification to module 308 (step 6) that provenance data has been stored. Module 308 then sends a notification to the coordinator service module 304 (step 7) that provenance has been created.

Accordingly, a user or another system can browse complete provenance DAG or select a provenance node to view detail metadata anytime via UI 302. Moreover, as mentioned above, a set of powerful revert functionalities is provided, which allow users to go back to existing provenance nodes for advanced use cases. The set includes, but is not limited to, "revert and reproduce" (FIG. 4B), "revert with new user application" (FIG. 4C), and "revert with data set update" (FIG. 4D).

Figure 4B:
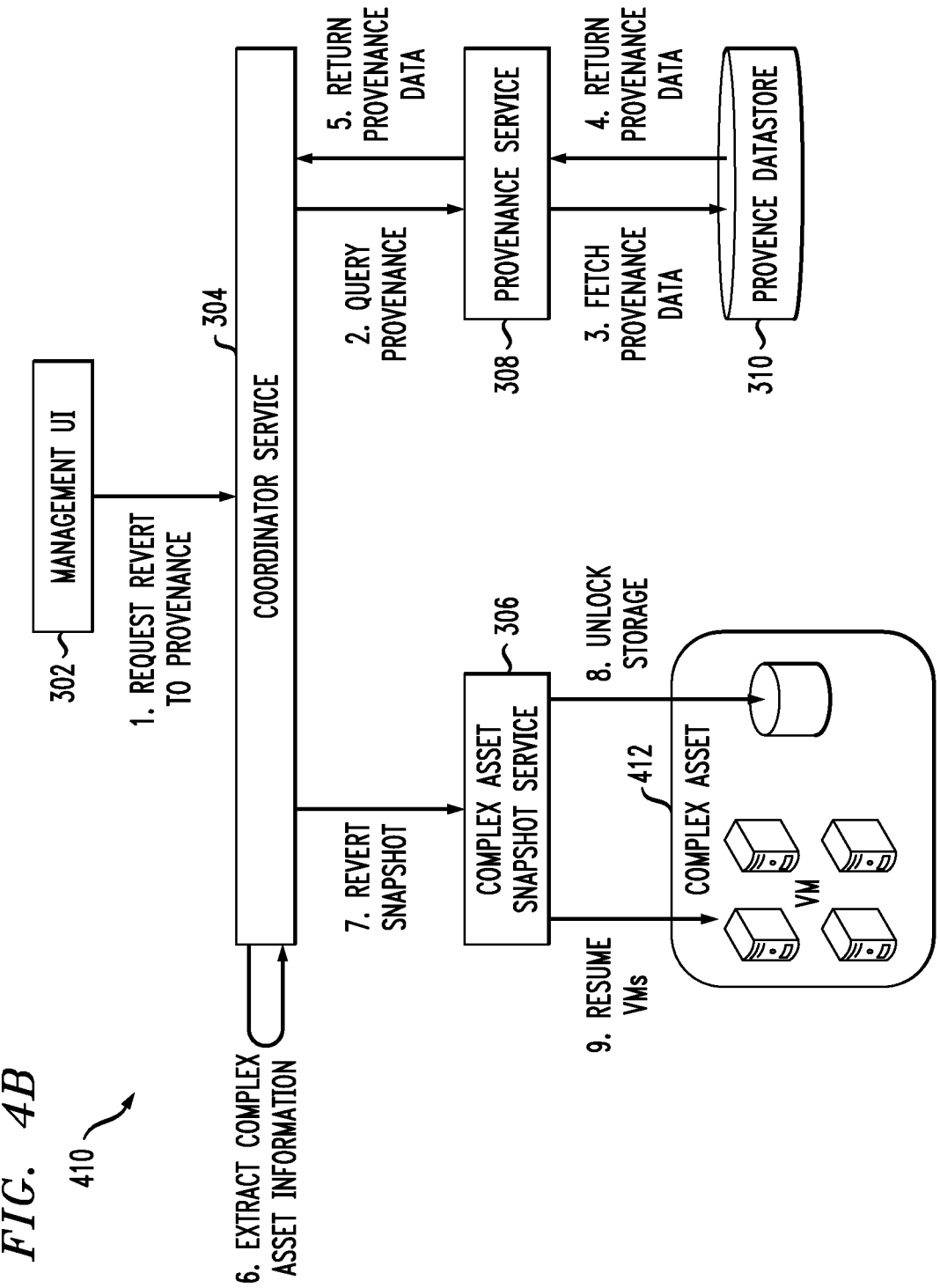
FIG. 4B shows a revert and reproduce methodology performed in the system of FIG. 3 in accordance with one embodiment of the invention.

FIG. 4B shows a revert and reproduce methodology 410. In one example, this methodology (as well as the ones described below in FIGS. 4C and 4D) can be used for troubleshooting operations. As shown, the user or another system submits a revert request to the coordinator service module 304 via UI 302 (step 1). Module 304 sends the query request to the provenance service module 308 (step 2). Module 308 fetches the requested provenance data (step 3), e.g., finds corresponding metadata for the specified provenance node stored in datastore 310. The datastore 310 returns the requested provenance data to the provenance service module 308 (step 4), which returns it to the coordinator service module 304 (step 5).

The coordinator service module 304 extracts complex asset snapshot information from the provenance metadata (step 6) and sends a revert request to complex asset snapshot service module 306 (step 7). Module 306 reverts virtual machines and external cloud storages from the specified snapshot. It does this by unlocking external cloud storages (step 8) and resuming virtual machines (step 9). The application resumes automatically when the virtual machines resume. Note that block 412 represents the "complex asset," e.g., in this case, the VMs and the storage units of the execution environment.

FIG. 4C shows a revert with new user application methodology 420. As shown, steps 1-7 in methodology 420 are the same as steps 1-7 of methodology 410 (FIG. 4B). The revert with new user application methodology allows the user or other system to restart from a provenance node with a different user application without discarding the already processed data set. In that case, all previous data is preserved and processing is handed over to the new application.

After steps 1-7, the complex asset snapshot service module 306 resumes the appropriate virtual machines (step 8). The coordinator service module 304 terminates/removes the old (original) user application and replaces it with the new (replacement) user application (step 9). The complex asset snapshot service module 306 unlocks the external storage which contains the original data set (step 10). Then, the coordinator service module 304 runs the new application on the data set (step 11). Note that block 422 represents the "complex asset," e.g., in this case, the VMs and the storage units of the execution environment.

Figure 4D:
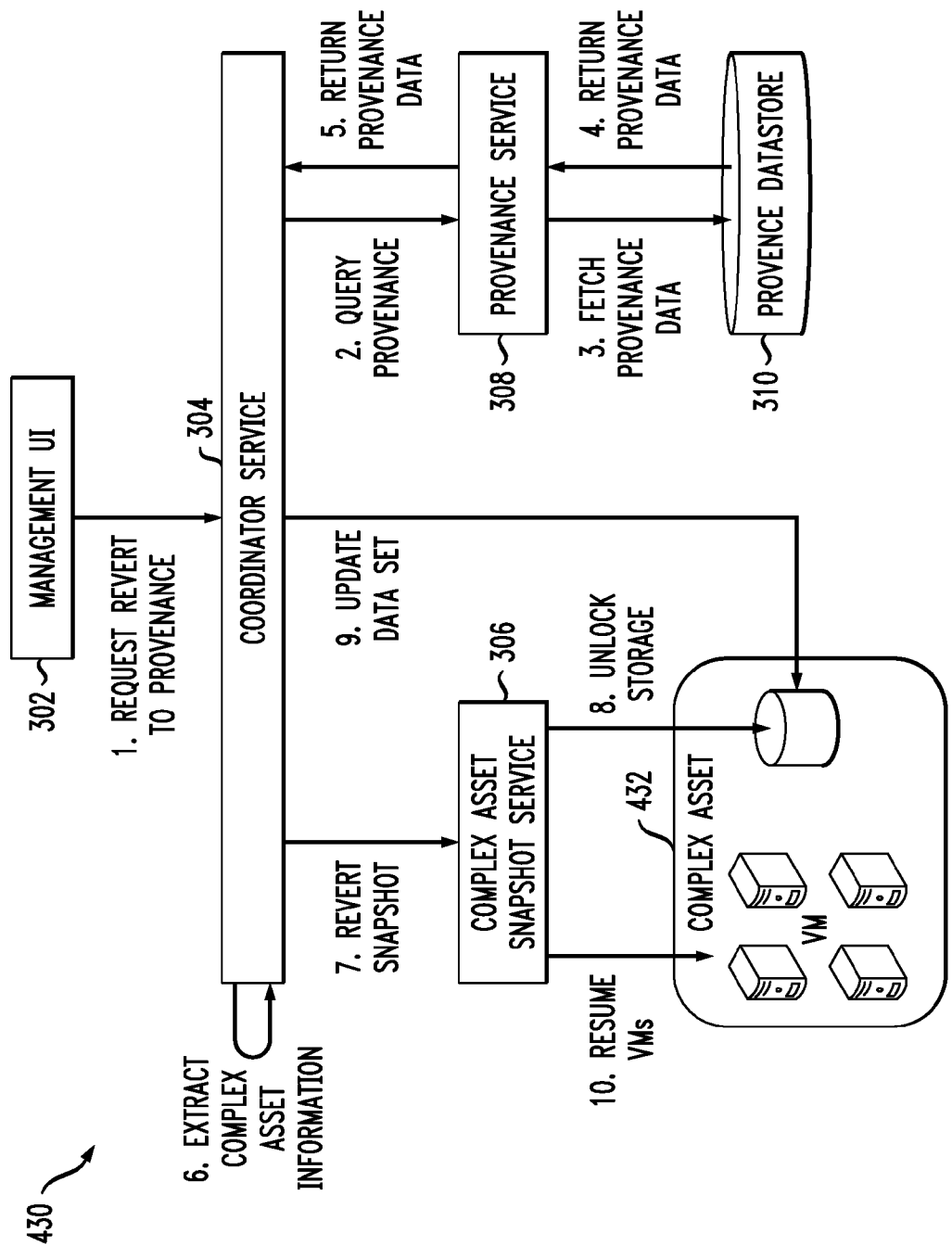
FIG. 4D shows a revert with data set update methodology performed in the system of FIG. 3 in accordance with one embodiment of the invention.

FIG. 4D shows a revert with data set update methodology 430. As shown, steps 1-7 in methodology 430 are the same as steps 1-7 of methodology 410 (FIG. 4B). The revert with data set update methodology is useful when one wants to replace/update the data set without interrupting/restarting the running of the current user application.

After steps 1-7, the complex asset snapshot service module 306 unlocks external storage; (step 8). The coordinator service module 304 updates the data set in the external storage according to user specification (step 9). Then, the complex asset snapshot service module 306 resumes virtual machines to execute the user application with the new/updated data set (step 10). The user application resumes automatically when the VMs resume. Note that block 432 represents the "complex asset," e.g., in this case, the VMs and the storage units of the execution environment.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:

capturing information associated with the execution of a given process in a given computing environment in accordance with a given process data set;

generating a provenance data set based on the captured information, the generated provenance data set comprising one or more states associated with one or more execution components of the given computing environment that existed during the execution of the given process, wherein the one or more execution components comprise one or more virtual machines and one or more storage units; and utilizing at least a portion of the generated provenance data set to revert the computing environment back to the one or more states associated with the one or more execution components of the given computing environment that existed during the execution of the given process;

replacing the given process with a replacement process; and executing the replacement process in the reverted computing environment;

wherein the captured information comprises an abstraction of a complex asset in the given computing environment;

wherein the steps are performed by at least one processing device comprising a processor coupled to a memory.

2. The method of claim 1, wherein the given process data set associated with the given process is preserved while the reverted computing environment executes the replacement process.

3. The method of claim 1, further comprising the step of replacing the given process data set with a replacement process data set.

4. The method of claim 1, wherein the one or more execution components of the given computing environment comprise one or more virtual resources.

5. The method of claim 1, wherein the one or more execution components of the given computing environment comprise one or more processing resources.

6. The method of claim 1, wherein the one or more execution components of the given computing environment comprise one or more storage resources.

7. The method of claim 1, wherein the given computing environment comprises a cloud computing environment.

8. A method comprising the steps of:

capturing information associated with the execution of a given process in a given computing environment in accordance with a given process data set;

generating a provenance data set based on the captured information, the generated provenance data set comprising one or more states associated with one or more execution components of the given computing environment that existed during the execution of the given process, wherein the one or more execution components comprise one or more virtual machines and one or more storage units;

utilizing at least a portion of the generated provenance data set to revert the computing environment back to the one or more states associated with the one or more execution components of the given computing environment that existed during the execution of the given process;

replacing the given process data set with a replacement process data set; and re-executing the given process in the reverted computing environment in accordance with the replacement process data set;

wherein the captured information comprises an abstraction of a complex asset in the given computing environment; and wherein the steps are performed by at least one processing device comprising a processor coupled to a memory.

9. The method of claim 1, wherein the information pertaining to the execution of the given process in the given computing environment is captured at a given instance in time.

10. A computer program product comprising a processor-readable storage medium having encoded therein executable code of one or more software programs, wherein the one or more software programs when executed by a processor of a processing device implement the steps of:

capturing information associated with the execution of a given process in a given computing environment in accordance with a given process data set;

generating a provenance data set based on the captured information, the generated provenance data set comprising one or more states associated with one or more execution components of the given computing environment that existed during the execution of the given process, wherein the one or more execution components comprise one or more virtual machines and one or more storage units;

utilizing at least a portion of the generated provenance data set to revert the computing environment back to the one or more states associated with the one or more execution components of the given computing environment that existed during the execution of the given process;

replacing the given process with a replacement process; and executing the replacement process in the reverted computing environment;

wherein the captured information comprises an abstraction of a complex asset in the given computing environment.

11. An apparatus comprising:

a memory; and a processor operatively coupled to the memory and configured to:

capture information associated with the execution of a given process in a given computing environment in accordance with a given process data set;

generate a provenance data set based on the captured information, the generated provenance data set comprising one or more states associated with one or more execution components of the given computing environment that existed during the execution of the given process, wherein the one or more execution components comprise one or more virtual machines and one or more storage units;

utilize at least a portion of the generated provenance data set to cause the computing environment to revert back to the one or more states associated with the one or more execution components of the given computing environment that existed during the execution of the given process;

replace the given process with a replacement process; and execute the replacement process in the reverted computing environment;

wherein the captured information comprises an abstraction of a complex asset in the given computing environment.

12. The apparatus of claim 11, wherein the information capturing operation is performed by an asset snapshot module executed by the processor.

13. The apparatus of claim 12, wherein the provenance data generating operation is performed by a provenance module executed by the processor.

14. The apparatus of claim 13, wherein the generated provenance data set is stored in a provenance datastore implemented in the memory.

15. The apparatus of claim 14, wherein the asset snapshot module and the provenance module are coordinated by a coordinator module executed by the processor.

16. An apparatus comprising:
a memory; and
a processor operatively coupled to the memory and configured to:
capture information associated with the execution of a given process in a given computing environment in accordance with a given process data set;
generate a provenance data set based on the captured information, the generated provenance data set comprising one or more states associated with one or more execution components of the given computing environment that existed during the execution of the given process, wherein the one or more execution components comprise one or more virtual machines and one or more storage units;
utilize at least a portion of the generated provenance data set to cause the computing environment to revert back to the one or more states associated with the one or more execution components of the given computing environment that existed during the execution of the given process;
replace the given process data set with a replacement process data set; and
re-execute the given process in the reverted computing environment in accordance with the replacement process data set;
wherein the captured information comprises an abstraction of a complex asset in the given computing environment.

* * * * *